United States Patent [19]

Hershberger

[11] 4,208,823
[45] Jun. 24, 1980

[54] FISH LURE APPARATUS

[76] Inventor: Welcome D. Hershberger, 16135 Petro Dr., Mishawaka, Ind. 46544

[21] Appl. No.: 957,647

[22] Filed: Nov. 3, 1978

[51] Int. Cl.² ............................................. A01K 85/00
[52] U.S. Cl. ................................................... 43/42.09
[58] Field of Search ....................................... 43/42.09

[56] References Cited

U.S. PATENT DOCUMENTS

| 2,587,736 | 3/1952 | Kindscher | 43/42.09 |
| 2,618,096 | 11/1952 | Wagner | 43/42.09 |
| 3,091,884 | 6/1963 | Brownstein | 43/42.09 |
| 3,296,734 | 1/1967 | Johnson | 43/42.09 |
| 3,395,480 | 8/1968 | McPherson | 43/42.09 |
| 3,490,165 | 1/1970 | Thomassin | 43/42.09 |
| 3,899,847 | 8/1975 | Dworski | 43/42.09 |

FOREIGN PATENT DOCUMENTS

| 2259533 | 8/1975 | France | 43/42.09 |
| 2290149 | 6/1976 | France | 43/42.09 |
| 70941 | 9/1946 | Norway | 43/42.09 |

*Primary Examiner*—Nicholas P. Godici
*Assistant Examiner*—J. T. Zatarga
*Attorney, Agent, or Firm*—Olsen and Stephenson

[57] ABSTRACT

Fishing apparatus is disclosed including a body member of a fish lure and an insert member removably fitted into the body member. The insert member is adapted to form the connecting link between a fish line connected to the head end of the insert member and a fishhook attached to the tail end of the insert member. The body member can be one of a variety of different body members each suitably constructed to be fitted onto the insert member so that a fisherman can, if he desires, carry only one insert member with attached fishhook and a plurality of different fish lure body members for interchangeable use on the insert member.

4 Claims, 6 Drawing Figures

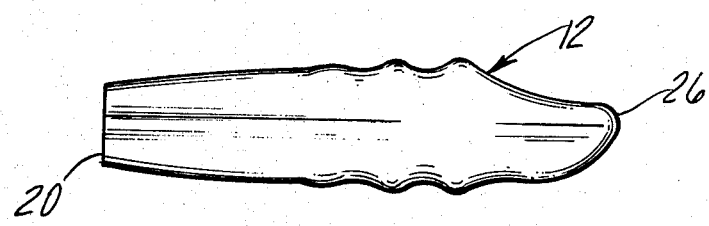
Fig-1
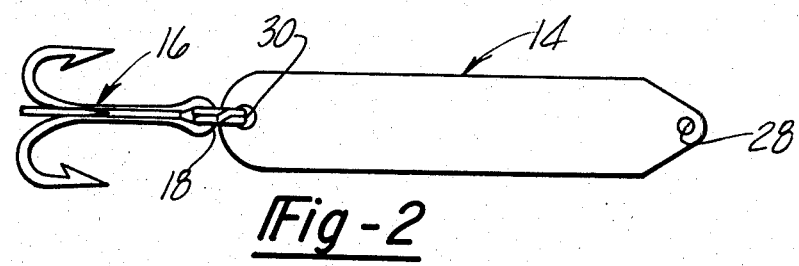
Fig-2
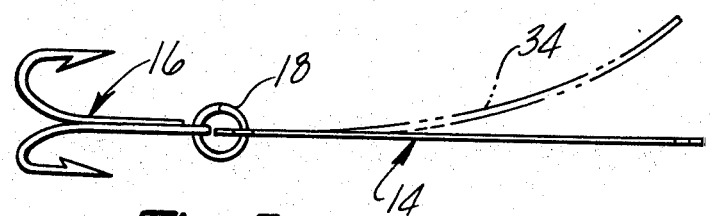
Fig-3
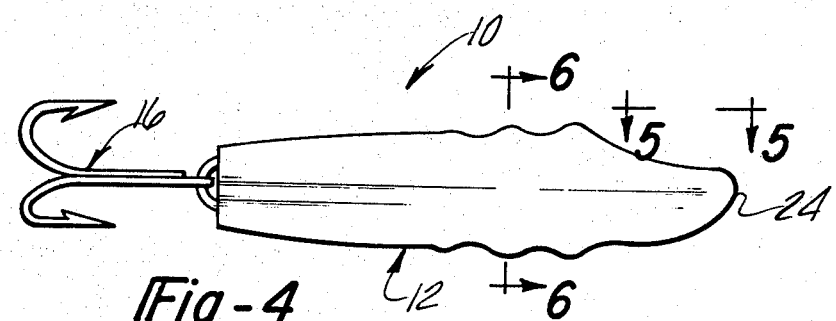
Fig-4
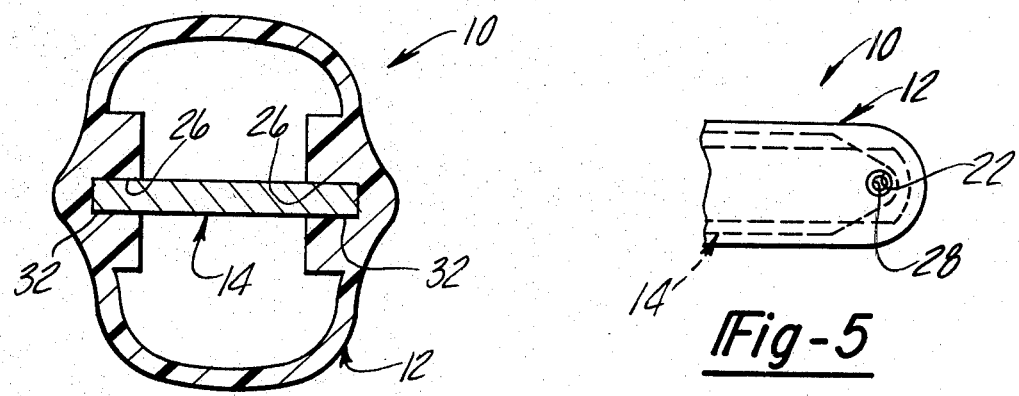
Fig-5
Fig-6

FISH LURE APPARATUS

BACKGROUND OF THE INVENTION

The present invention relates to fish lures, and particularly to a fish lure that can be disassembled to enable the fisherman to select any one of a variety of different body members for use when reassembling the fish lure.

It is conventional practice for fishermen to carry with them a fishing tackle box containing a variety of artificial fish lures. Each of these lures has one or more hooks and each is designed to be used most advantageously under certain specified conditions. Thus, the fisherman may select for use any one of a variety of lures, depending upon the time of day, the depth of water being fished, the weed conditions that prevail, the type of fish present, and the like. Because of the hazards and obvious problems involved in carrying a plurality of lures with attached hooks, a tackle box is necessary for transporting and storing the variety of lures. This is often inconvenient and burdensome, and in addition can be costly.

SUMMARY OF THE INVENTION

The present invention has overcome the inadequacies of the prior art and provides a fish lure that has a body member removably fitted on an insert member that extends essentially the length of the body member and serves as the connecting link between a fish line to which the lure is attached and a fishhook at the tail end of the lure. By virtue of this construction and arrangement, a plurality of body members can be carried by the fisherman which can be interchangeably mounted on the insert member.

Normally, the body members will be free of fishhooks and can be made of elastomeric or organic plastic material so that they can easily be carried by the fisherman. Each body member can be designed for use under different fishing conditions. Thus, only one insert member with hooks need be carried by the fisherman together with a plurality of body members which can be used interchangeably with the insert member to provide the lure that is desired by the fisherman for his immediate needs.

The body members can be molded or formed in other conventional ways of suitable materials, such as elastomeric or suitable flexible or rigid plastic materials. The materials may be selected to provide the desired color and appearance, and the shape of the body member can be such as to provide the desired action of the lure when moving in water.

Thus, it is one of the objects of the present invention to provide an improved fish lure that has a body member that can be separated from the remainder of the fish lure and interchanged with other body members to enable the fisherman to assemble with ease and at low cost a variety of different fish lures.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a side elevational view of a body member adapted for use as a component of a fish lure embodying the present invention;

FIG. 2 is a top plan view of an insert member with a hook attached to the tail end thereof which is adapted to be a component of a fish lure embodying the present invention;

FIG. 3 is a side elevational view of the insert member shown in FIG. 2, and showing in broken lines a modified configuration that may be embodied;

FIG. 4 is a fish lure embodying the present invention that includes the body member shown in FIG. 1 and the insert members shown in FIGS. 2 and 3;

FIG. 5 is a fragmentary top plan view of the fish lure as viewed from the lines 5—5 of FIG. 4; and FIG. 6 is an enlarged section taken on the lines 6—6 of FIG. 4.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The fish lure 10 includes the body member 12 and the insert member 14 to which is attached the fishhook 16 by means of the retainer ring 18.

The body member 12 is molded of a suitable organic plastic material and may be either flexible or rigid. The body member 12 is hollow and is open at its tail end 20 and is apertured at 22 at its head end 24. The body member 12 has an internal configuration defining the grooves 26 which extend from the open end 20 lengthwise of the body member to adjacent the head end 24.

The insert member 14 is a sheet metal strip which has an aperture 28 at its head end to which a fish line (not shown) is adapted to be secured in the conventional manner, and it has at its tail end the aperture 30 to which the fishhook 16 is connected by means of the retaining ring 18. Thus, the insert member 14 will serve as a connecting link between the fish line (not shown) and the fishhook 16 to assume the full load that may be applied between the fish line and the fishhook 16 when a fish has been caught.

As can be seen best in FIG. 6, the body member 12 and the insert member 14 are fitted together by the tongue-and-groove means formed by the grooves 26 and the tongue-like lateral edges 32 of the insert member 14. The insert member 14 can easily be removed from the body member 12 merely by disconnecting the fish line (not shown) from the head end 24 of the lure, after which the insert member 14 can be withdrawn from the open end 20 of the body member 12. For this purpose, the grooves 26 are aligned with the open end 20. Also, as can be seen in FIG. 5, the apertured end 22 of the body member 12 will have its apertures in registry with the aperture 28 of the insert member 14 when the latter is inserted through the body member 12 so that a conventional ring can be fitted therethrough for attachment of a fishline.

As previously indicated, the body member 12 can be manufactured by a variety of conventional procedures and can be manufactured of numerous suitable materials. The sheet metal of which the insert member 14 is made may be a suitable stainless steel to provide rust-free and resilient properties, but other suitable materials may be used. If desired, the insert member 14 can be a flat strip as is shown in solid lines in FIG. 3 or it can be preformed to have other desired configurations, such as the curved configuration as shown by the broken lines 34. Also, the metal can be one which has deflectable properties so that the fisherman can shape the flat strip to a desired shape, such as that at 34, to modify the external configuration of the body member 12 to suit the particular needs of the fisherman.

It is claimed:

1. A fish lure comprising a hollow body member having head and tail ends and open at the tail end, an insert member removably fitted lengthwise into said body member through said tail end, said insert member being a flat strip of metal with opposite lateral edges, a fishhook attached to the tail end of said insert member, the head end of said insert member having means for attachment to a fish line so that said insert member will assume the full load that may be applied between the fish line and the fishhook, said hollow body member being formed of organic plastic material and having an internal wall structure defining grooves in opposite interior walls extending lengthwise of the body member from the open tail end to the head end thereof, said grooves fitting in lengthwise sliding relationship on the lateral edges of said insert so that a plurality of hollow body members with similar internal wall structures can be interchangeably used on said insert member.

2. The fish lure that is defined in claim 1, wherein said means for attachment to a fish line includes an aperture in said head end of the insert member, and said body member is apertured at its head end so that a ring can be fitted through said apertured head end and said aperture in said head end of the insert member for attachment to a fish line.

3. The fish lure that is defined in claim 1, wherein said grooves are aligned with the opening in said tail end of the hollow body member to facilitate insertion and removal of the insert member relative to the body member.

4. The fish lure that is defined in claim 2, wherein said head end of the hollow body member is closed except for the aperture therein so that the head end of the insert member is confined in said body member.

* * * * *